United States Patent [19]
Heitz et al.

[11] 4,352,851
[45] Oct. 5, 1982

[54] VOID FILLER FOAM FIRE SUPPRESSION SYSTEM

[75] Inventors: Roger M. Heitz, Palos Verdes Estates; Franklin Hill, Van Nuys, both of Calif.

[73] Assignee: The United States of America as represented by the Secretary of the Navy, Washington, D.C.

[21] Appl. No.: 217,282

[22] Filed: Dec. 16, 1980

[51] Int. Cl.³ ............................................. B32B 3/26
[52] U.S. Cl. .................................. 428/250; 428/252; 428/267; 428/475.5; 428/492; 428/911; 428/912
[58] Field of Search ............ 428/250, 252, 267, 475.5, 428/492, 911, 912

[56] References Cited
U.S. PATENT DOCUMENTS

| | | | |
|---|---|---|---|
| 1,349,290 | 8/1920 | Murdock | 161/160 |
| 1,386,791 | 8/1921 | Murdock | 161/190 |
| 3,509,016 | 4/1970 | Underwood et al. | 161/190 |
| 3,535,198 | 10/1970 | Bloom | 161/161 |
| 3,536,576 | 10/1970 | Schwartz | 161/161 |
| 3,575,786 | 4/1971 | Baker et al. | 161/165 |
| 3,664,904 | 5/1972 | Cook | 161/50 |
| 3,787,279 | 1/1974 | Winchester | 161/160 |
| 3,801,425 | 4/1974 | Cook | 161/190 |
| 3,951,190 | 4/1976 | Suter | 150/0.5 |
| 3,969,563 | 7/1976 | Hollis, Sr. | 428/175 |
| 4,115,616 | 9/1978 | Heitz et al. | 428/911 |

Primary Examiner—Marion McCamish
Attorney, Agent, or Firm—R. F. Beers; W. Thom Skeer

[57] ABSTRACT

A laminated barrier comprising alternate layers of rigidized low density cellular material and ballistic nylon cloth useful in an aircraft for minimizing projectile and shrapnel damage, and possible fuel ignition in the fuselage caused by groundfire in the vicinity of fuel tanks located adjacent to the engines.

10 Claims, 6 Drawing Figures

U.S. Patent    Oct. 5, 1982    Sheet 3 of 3    4,352,851
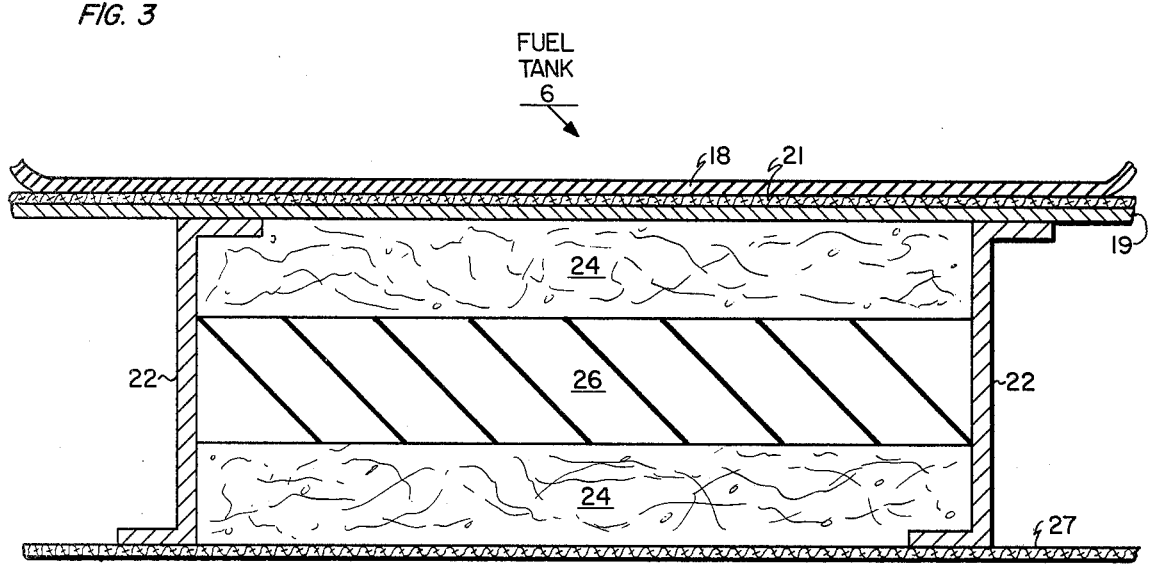
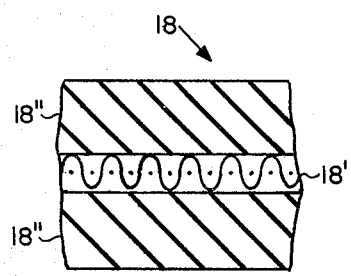
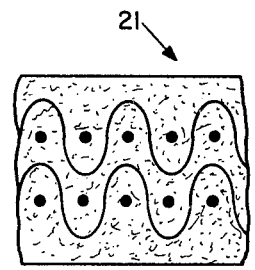
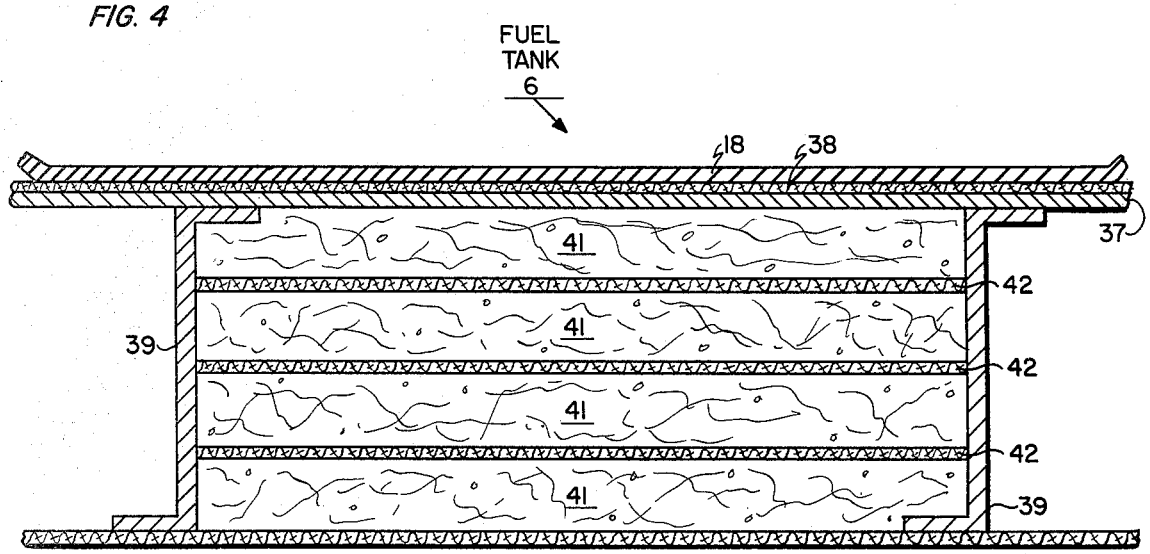

VOID FILLER FOAM FIRE SUPPRESSION SYSTEM

BACKGROUND OF THE INVENTION

1. Field of the Invention

The present invention discloses a void filler foam barrier which prevents leakage and ignition of fuel caused by ground fire piercing aircraft fuel tanks.

2. Description of the Prior Art

A previous method discloses a metallic tank having an inner and outer shell, the space between the two shells being filled with talc-coated rubber granules, which are installed under pressure and designed to expand and fill any holes caused by a projectile penetrating the shell.

Another previous method relates to a means for closing punctures in a fuel container by expansion of rubber sheets which cover the container and expand when subjected to wetting by hydrocarbons.

And, another previous method embodies a metal fuel tank covered with an elastomeric material having sufficient resiliency to stretch and thereby permit passage of a projectile therethrough and then contract to its original dimension to substantially seal the opening made by the projectile. Still another embodiment of the previous method includes a fuel activated layer of uncured or partially cured rubber operating in combination with the elastomeric material to completely seal punctures in fuel tanks.

And yet another previous method discloses a fuel expandable material such as rubber or latex located between outer plies of fluid impervious material; the plies being held together by stitches limiting the degree of relative movement of the outer plies when the expandable material swells.

Finally another previous method reduces the vulnerability of fuel tanks to structural damage by attenuating shock wave effects resulting from penetration of fuel tanks by projectiles. This previous method uses a crushable rigid foam liner located adjacent the inside surface of the fuel tank in order to absorb shock waves.

SUMMARY OF THE INVENTION

The present invention discloses a method preventing ballistic damage to aircraft fuel tanks or other fluid stores stored in the fuselage adjacent avionics or engines. A laminated wall or barrier is mounted between the bottom of the fuel tanks and the empty or partially empty space in the fuselage. This laminated wall comprises alternate layers of rigidized reticulated foam material, precompressed natural rubbers, and ballistic nylon fabric laminates, wherein the alternate layers are bonded together to form a unitary protective wall.

OBJECTS OF THE PRESENT INVENTION

One object of the present invention is to minimize damage in the fuel tank bay of an aircraft.

Another object is to prevent leakage of the fuel in the case of penetration of the fuel tanks by bullets or shell fragments.

Still another object is to minimize the danger of ignition of fuel leaking into the fuselage below the fuel tank.

These objects and other features of the present invention are apparent in the following descriptions.

DESCRIPTION OF THE DRAWINGS

FIG. 3, 3a and 3b are an enlarged cross-sectional view of a preferred form of the laminated barrier of the present invention; and FIG. 4 is an enlarged cross-sectional view of a modified form of the laminated barrier of the present invention.

DESCRIPTION OF THE PREFERRED EMBODIMENT

Figure 1:
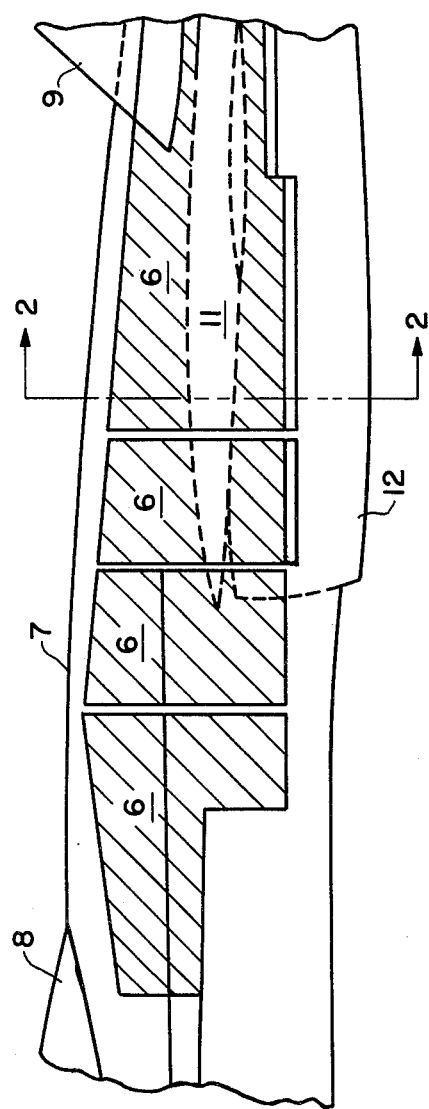
FIG. 1 is a fragmenting side elevation view of an aircraft embodying the present invention.

FIG. 1 shows a plurality of fuel tanks 6 stored in a fuselage 7 of an aircraft aft of cockput 8 and forwardly of an empennage 9. The aircraft includes a main wing 11, and an engine air inlet duct 12, which are indicated partially by dotted lines.

Figure 2:
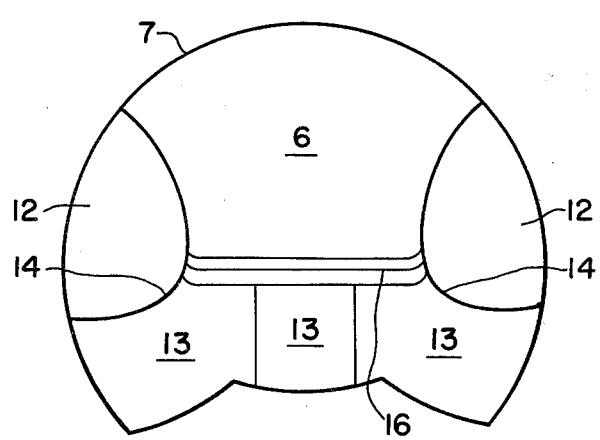
FIG. 2 is a diagrammatic cross-sectional view taken on lines 2—2 in FIG. 1 showing a preferred location and an embodiment of the present invention.

The cross-sectional view of FIG. 2 taken on lines 2—2 of FIG. 1, shows fuel tanks 6 stored in fuselage 7 between engine air inlet ducts 12 on either side thereof. The bottoms of fuel tanks 6 normally rest on fuselage structure (not shown) provided therefor. A plurality of spaces 13 between the fuel tanks and the underside of fuselage 7 may be filled or partially filled with plumbing, equipment, etc. (not shown), but it is understood that space 13 nevertheless contains sufficient air to support combustion.

A barrier 16, in the present invention, spans the distance between inside walls 14 of engine air inlet ducts 12, and closes off space between tanks 6 and fuselage spaces 13, as shown in FIG. 2.

A preferred construction of the invention is shown in FIG. 3. A bottom wall 18 of tank 6 is fabricated of flexible ballistic nylon cloth 18' coated on each side with a rubber or rubber-like material 18" FIGS. 3a and b, and rests on an aluminum, or other metal, skin 19 with a 2-ply laminate of polysulfide impregnated nylon fabric 21 sandwitched therebetween.

A pair of metal "Z" stiffeners 22 form lateral supports for the laminated barrier which, in the preferred embodiment, comprises a plurality of layers 24 of rigidized reticulated foam, with an intermediate layer 26 of precompressed fuel-sensitive natural rubber foam sandwiched therebetween; the layers are bonded at their interfaces with a polysulfide sealant, or the like. The lower side of barrier 16 is covered with a polysulfide impregnated laminate 27 of ballistic nylon cloth.

Bullets or shell fragments from ground fire penetrating fuel tanks 6 must first penetrate the underside of fuselage 7, laminate 27, and through layers 24 and 26 before reaching fuel tank 6. Rigidized foam layers 24 minimize tearing action by bullets and fragments in the structure. Central compressed rubber-layer 26, upon contact with fuel leaking from tank 6 will swell, closing and sealing the hole defined by the path or paths of the bullets and fragments, thereby preventing leaking fuel from pierced tank 6 from accumulating in fuselage 7 and ultimate ignition of the fuel fumes by the heat of the engines.

A modified barrier of the present invention is shown in FIG. 4, mounted and located below fuel tanks 6 in the same manner as the barrier described in FIG. 3. Bottom wall 18 of fuel tank 6 is supported on an aluminum or other metal skin 37 with a layer of ballistic nylon cloth 38 sandwiched therebetween. The barrier, which is contained by a plurality of metal "Z" stiffeners 39, comprise multiple layers 41 of soft reticulated foam separated by single plies or layers 42 of rubber impregnated ballistic cloth.

The reaction of the barriers described in FIGS. 3 and 4 differ in that the barrier described in FIG. 3 is self-sealing and the one described in FIG. 4 is not. However, the function of both barriers is the same which is to minimize the damage and prevent or eliminate fast leakage of fuel from fuel tanks 6 into the fuselage spaces below the fuel tank bay at initial penetration by bullets or shell fragments. The barrier described in FIG. 3 will not only slow down the fuel leakage but will self-seal instantaneously and prevent any fuel from leaking into the fuselage spaces. The barrier described in FIG. 4 will not self-seal but will retard the fuel leakage into the fuselage spaces in such a way that when the dispersed fuel finally reaches the fuselage spaces the time of the critical fire hazard has passed.

What is claimed is:

1. Aircraft armor comprising:
    a planiform sheet metal member having first and second sides;
    a layer of polysulfide impregnated fabric on said first side planiform sheet metal member;
    a plurality of lateral support members attached to said second side of said sheet metal member providing stiffening therefor and defining an armor volumes therebetween;
    at least one layer of reticulated foam within said volume extending between said lateral support member; and
    a layer of polysulfide impregnated ballistic cloth across said plurality of lateral support members and contiguous with said at least one layer to form a cover for said armor.

2. Aircraft armor according to claim 1 wherein a first layer of reticulated foam is positioned adjacent said planiform sheet metal member and a second layer of reticulated foam is contiguous with said layer of polysulfide impregnated ballistic cloth.

3. Aircraft armor according to claim 2 wherein a layer of pre-compressed fuel sensitive natural rubber foam is positioned between said first and second layers of reticulated foam.

4. Aircraft armor according to claim 3 wherein said plurality lateral support members are metal "Z" members.

5. Aircraft armor according to claim 3 wherein said armor is positioned with said layer of polysulfide impregnated fabric adjacent an aircraft fuel tank.

6. Aircraft armor according to claim 2 wherein a layer of rubber impregnated ballistic cloth is positioned between said first and second layers of reticulated foam.

7. Aircraft armor according to claim 6 wherein said plurality lateral support members are metal "Z" members.

8. Aircraft armor according to claim 6 wherein said armor is positioned with said layer of polysulfide impregnated fabric adjacent an aircraft fuel tank.

9. Aircraft armor according to claim 2 wherein said armor is positioned with said layer of polysulfide impregnated fabric adjacent an aircraft fuel tank.

10. Aircraft armor according to claim 1 wherein said plurality lateral support members are metal "Z" members.

* * * * *